Oct. 16, 1945.  H. F. MacMILLIN  2,386,966
HIGH FREQUENCY ELECTROSTATIC HEATING OF PLASTICS
Filed March 10, 1943  6 Sheets-Sheet 1
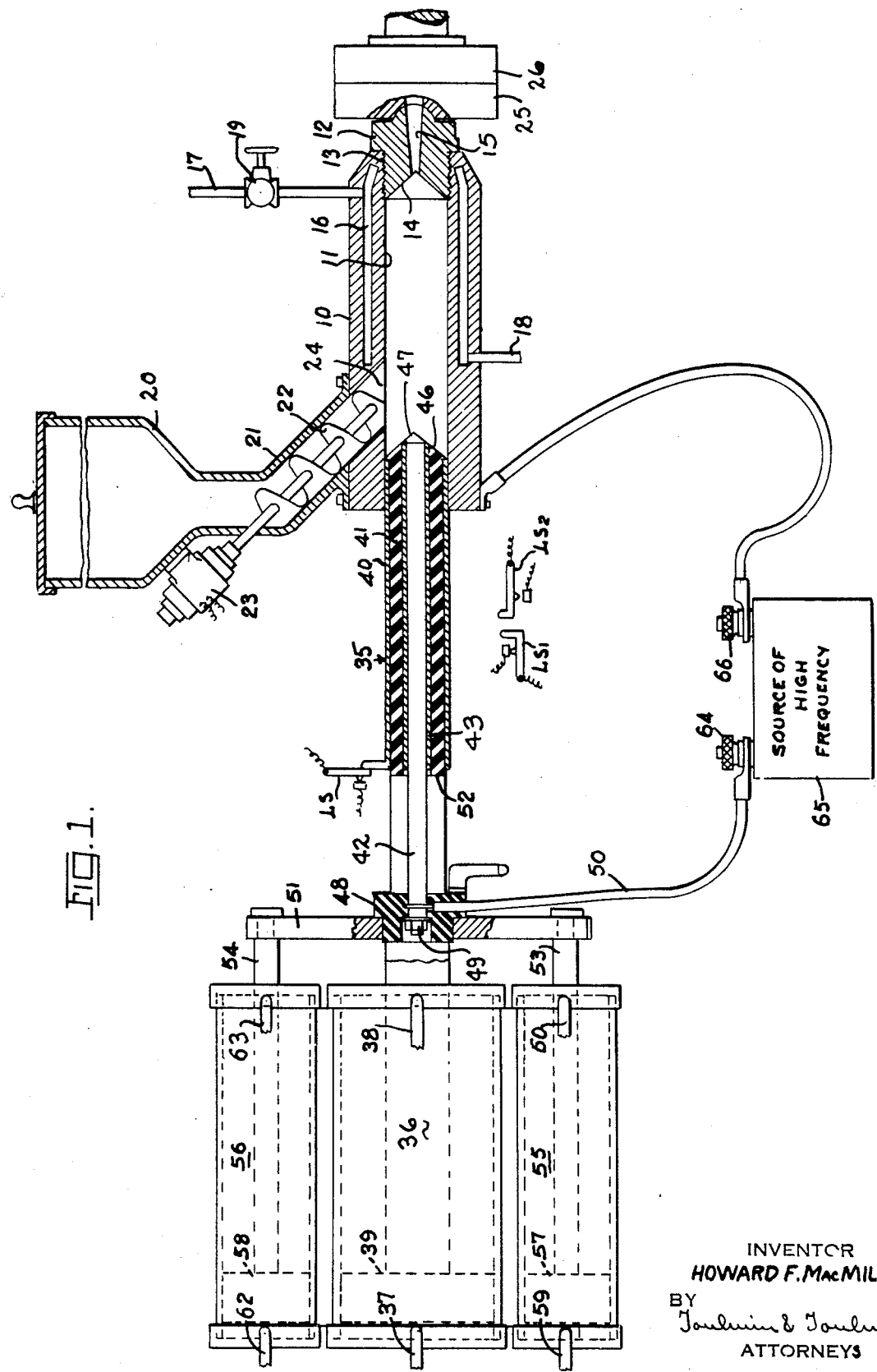

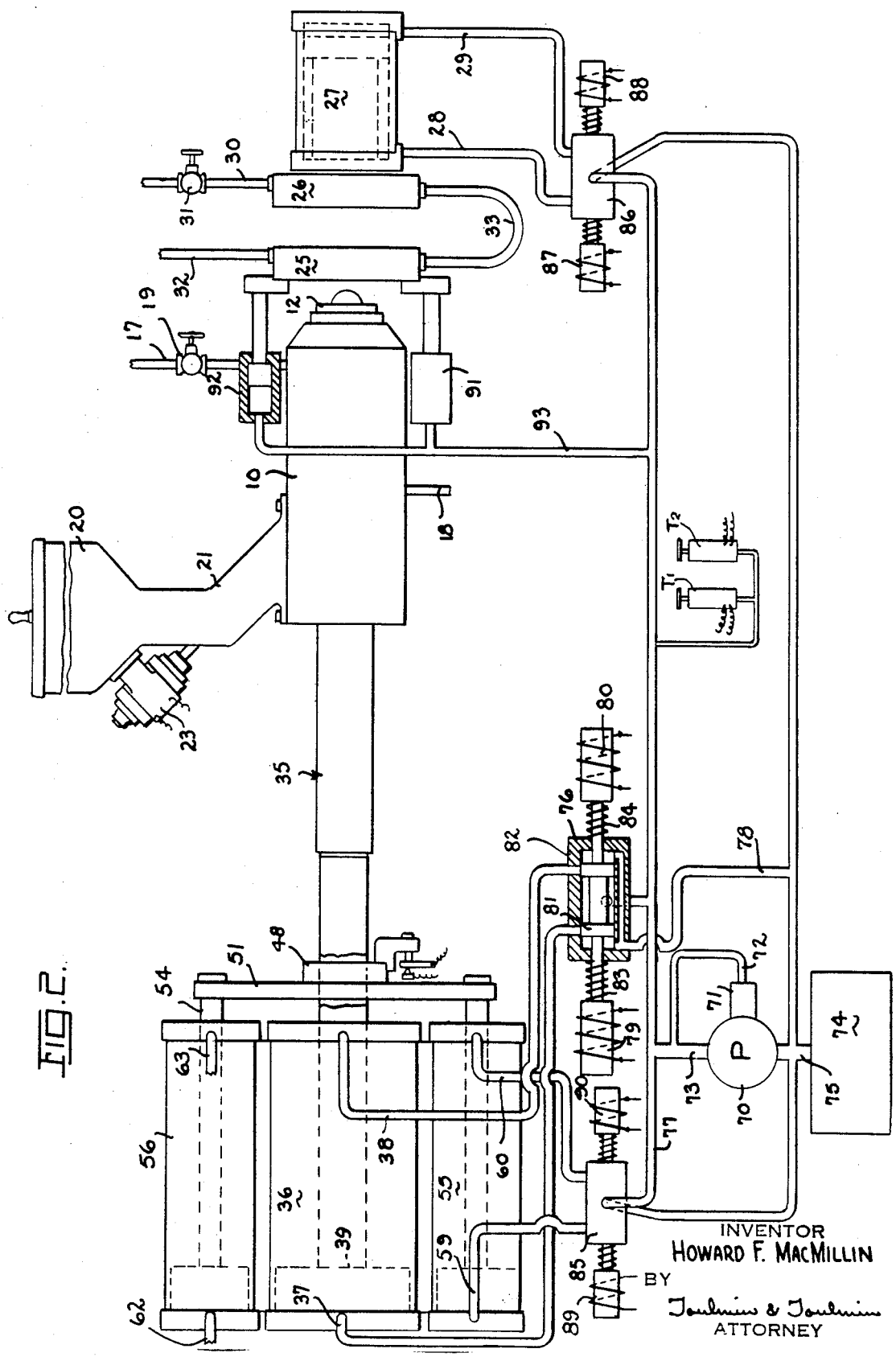

Oct. 16, 1945. H F. MacMILLIN 2,386,966
HIGH FREQUENCY ELECTROSTATIC HEATING OF PLASTICS
Filed March 10, 1943 6 Sheets-Sheet 3
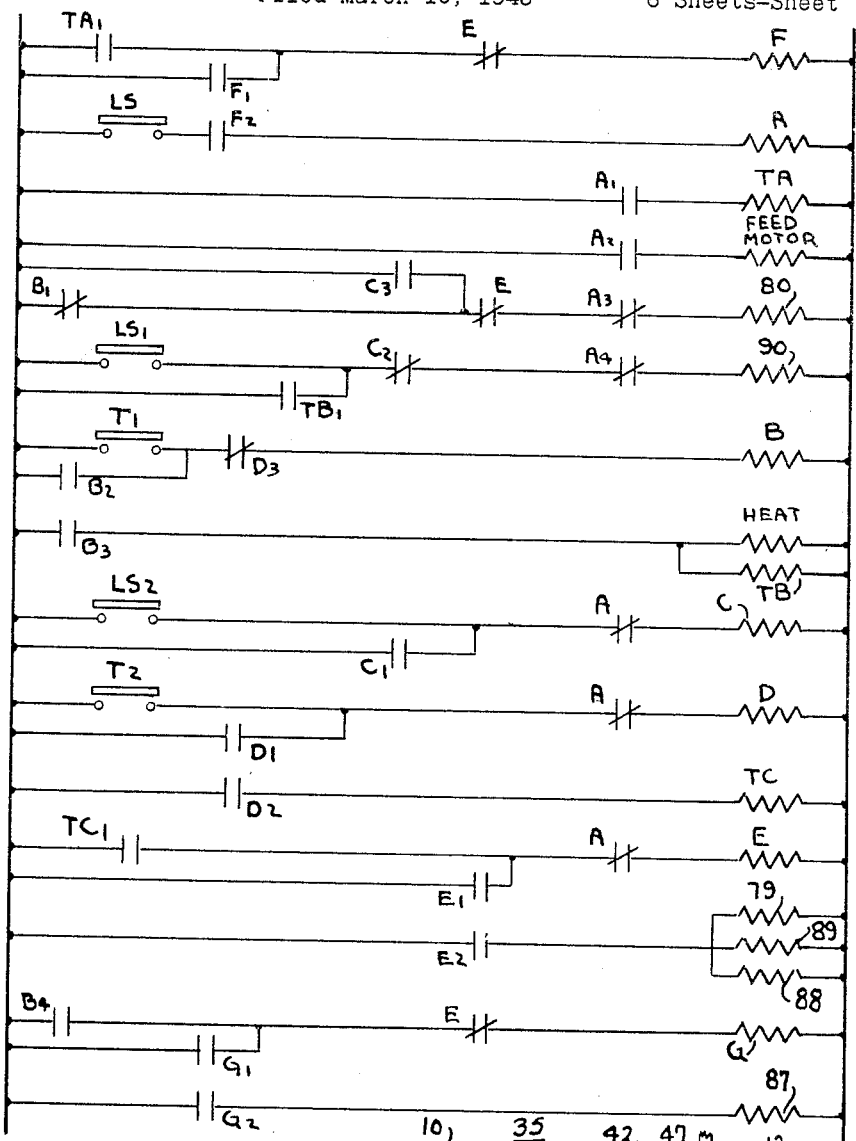
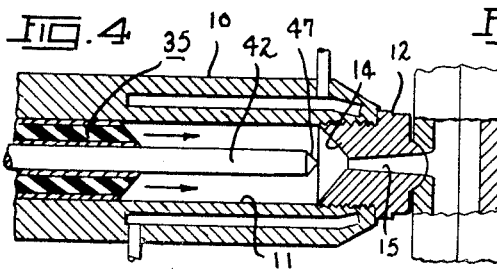
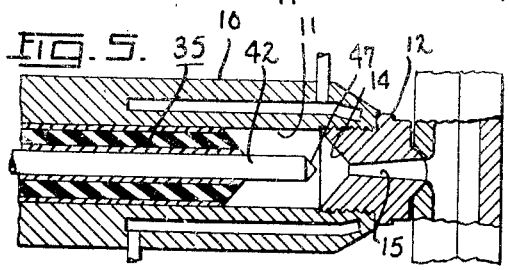
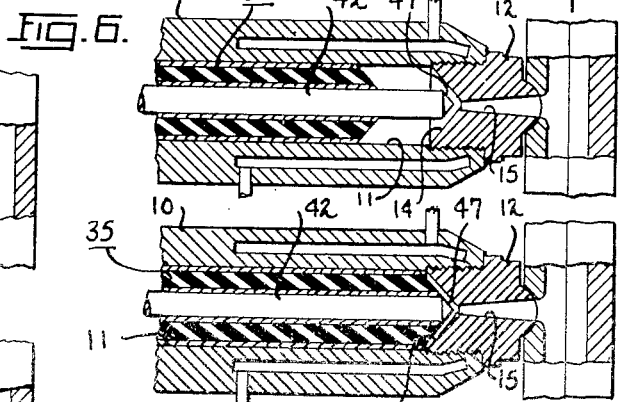
INVENTOR
HOWARD F. MacMILLIN
BY
Toulmin & Toulmin
ATTORNEYS

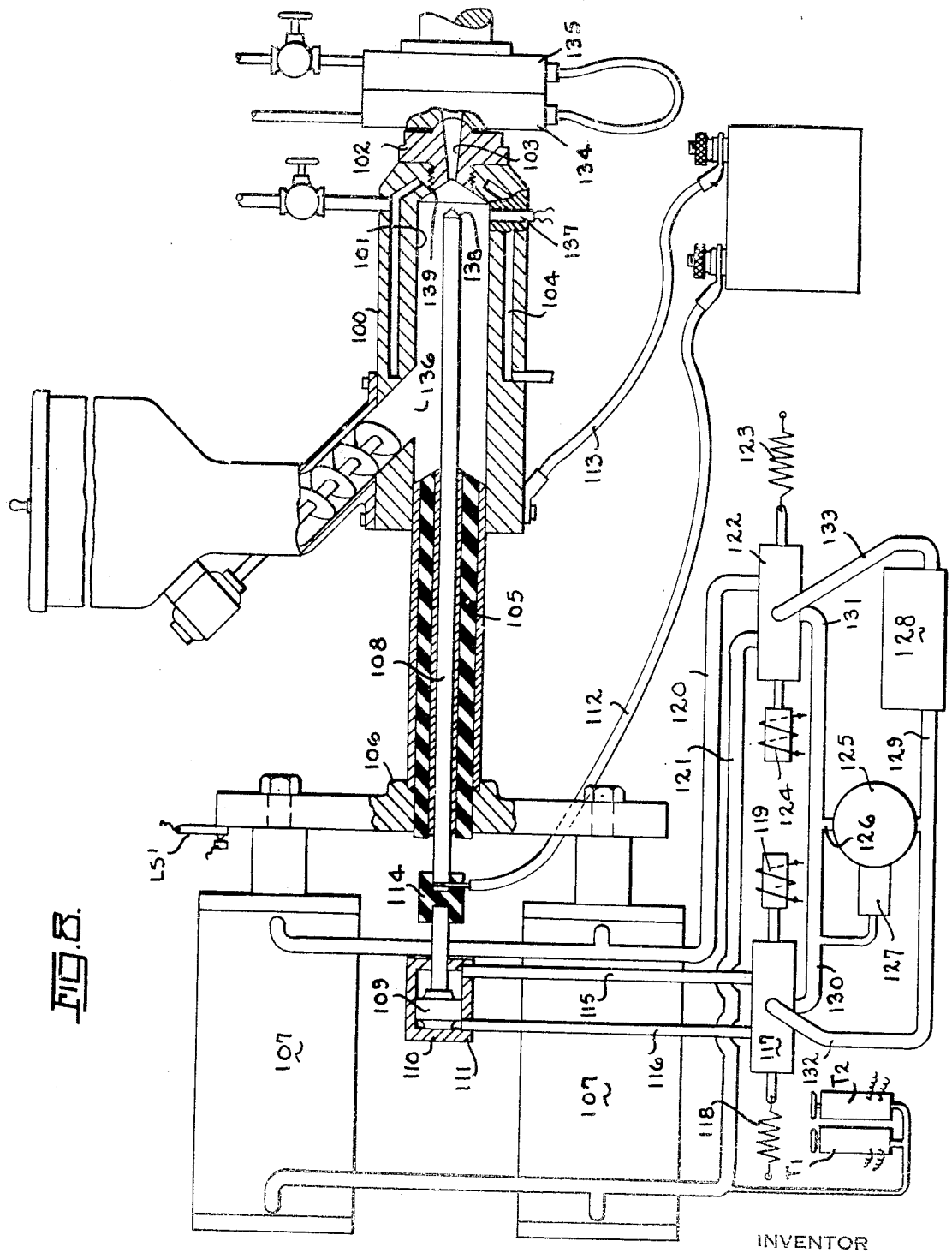

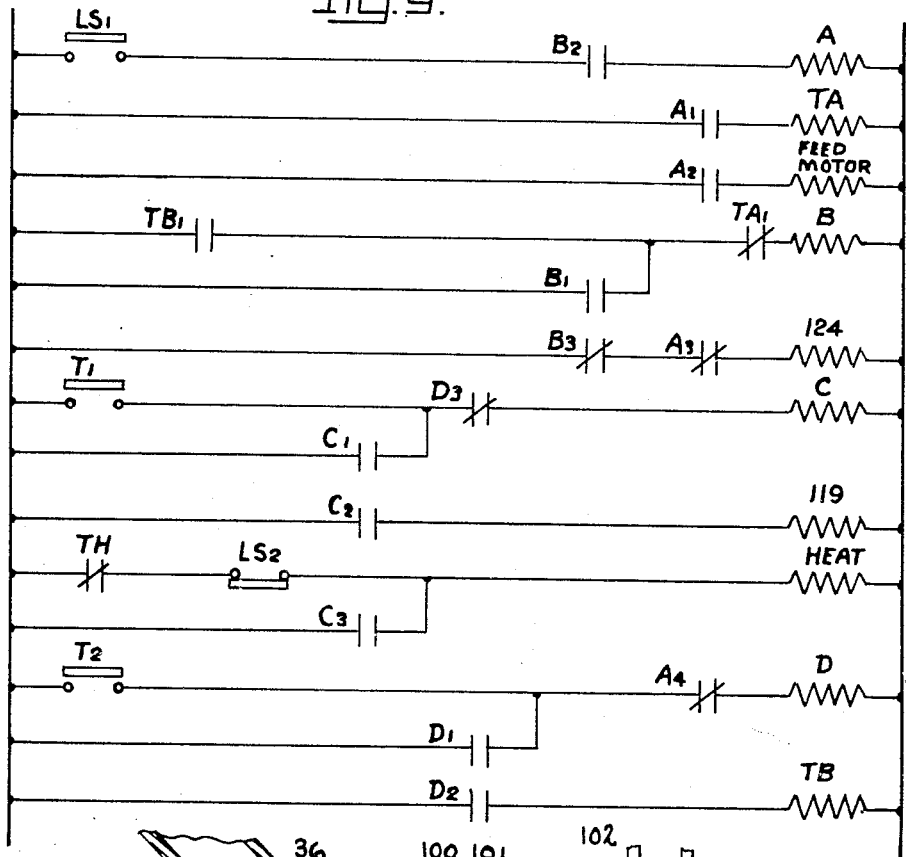

Oct. 16, 1945.　　　　H. F. MacMILLIN　　　　2,386,966
HIGH FREQUENCY ELECTROSTATIC HEATING OF PLASTICS
Filed March 10, 1943　　　　6 Sheets-Sheet 6
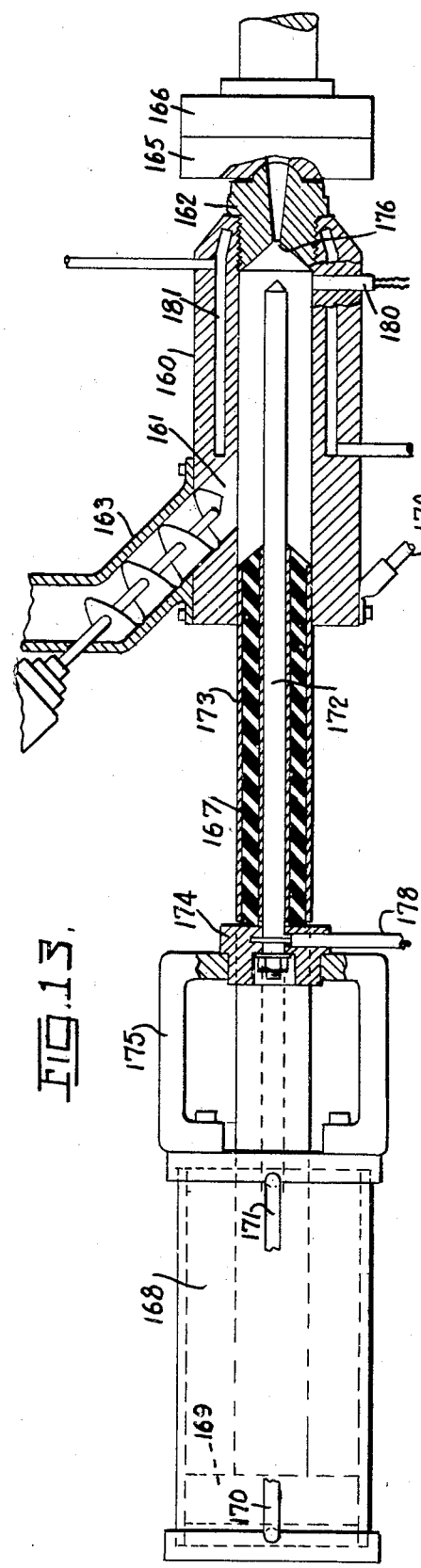
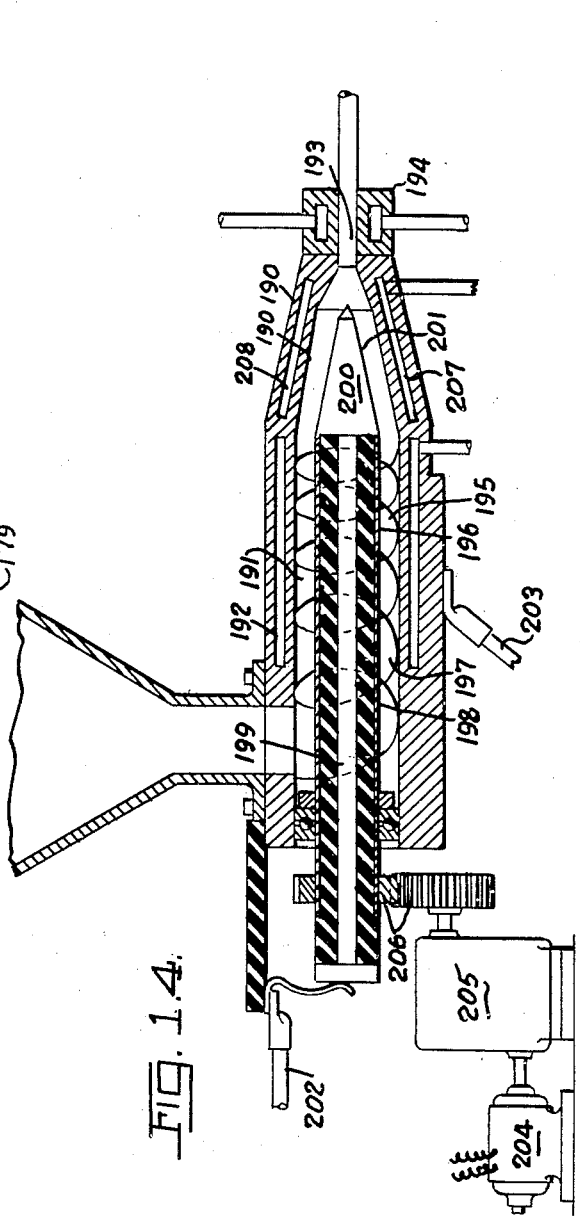
INVENTOR
HOWARD F. MacMILLIN,
BY
Toulmin & Toulmin
ATTORNEYS Patented Oct. 16, 1945

2,386,966

UNITED STATES PATENT OFFICE 2,386,966

HIGH-FREQUENCY ELECTROSTATIC HEATING OF PLASTICS

Howard F. MacMillin, Mount Gilead, Ohio, assignor to The Hydraulic Development Corp., Inc., Wilmington, Del., a corporation of Delaware Application March 10, 1943, Serial No. 478,677

22 Claims. (Cl. 18—30)

This invention relates to a method and apparatus for injection molding of plastic material.

An object of the invention is to provide a method and apparatus for injection molding of plastic material wherein the plastic material is heated to plasticity by means of a high frequency electric current and to intensify the heating effect upon the plastic material by means of a high frequency current just before the material is ejected from the injection machine.

Another object of the invention is to provide a method and apparatus for heating plastic material that is to be ejected from an injection machine using high frequency current and arranging the apparatus so that there is no metal within the high frequency field.

Another object of the invention is to provide a method and apparatus for heating plastic material by the use of high frequency current so that only the plastic material is heated when passing through the injection cylinder of the machine whereby there will be no residual heat tending to elevate the temperature of plastic material when the heating effect of the high frequency current is stopped.

Another object of the invention is to provide a method and apparatus for heating of plastic material within an injection cylinder by means of high frequency current so that the plastic material is elevated to a temperature somewhat below the temperature at which it is to be ejected into the mold and the intensity of the heating effect is increased in the area adjacent the nozzle orifice of the injection machine so that the temperature of the material is elevated just before the material enters the nozzle to increase the plasticity of the material for injection into the mold.

Another object of the invention is to provide a method and apparatus for heating a thermosetting resin by means of high frequency current while within an injection cylinder so that the thermosetting resin is initially raised to a temperature to plasticize the same but to hold the temperature of the material below the critical temperature and to provide an intensification of the heating effect upon the thermosetting resin just before it passes into the injection nozzle of the injection cylinder so that it is elevated to or slightly above the critical temperature to begin polymerization of the material at the time it is injected into the mold.

Another object of the invention is to provide a method and apparatus for heating plastic material within an injection cylinder by means of high frequency heat in a manner that the high frequency heating effect is produced uniformly throughout the mass of plastic in the injection cylinder during an initial heating stage and subsequently the heating effect on the plastic material is intensified in the area adjacent the nozzle of the injection cylinder so that the temperature of the material will be increased just before it is forced through the nozzle of the injection cylinder.

Another object of the invention is to provide a method and apparatus for heating plastic material within an injection cylinder by means of a high frequency current in a manner that only the plastic material is elevated in temperature and the injection cylinder of the machine can be cooled to prevent the same from retaining heat absorbed from the plastic material and thereby prevent any residual heat in the injection cylinder from effecting the temperature of the plastic material.

Another object of the invention is to provide an apparatus for injection molding of plastic material wherein the injection cylinder of the injection machine provides one electrode from a source of high frequency current and the second electrode is carried by the injection plunger in a manner that it is adapted to precede the injection plunger in its movement through the injection cylinder so that the plastic material within the injection cylinder is heated within the high frequency field set up between the electrode carried by the plunger and the injection cylinder.

It is another object of the invention to provide an apparatus constructed in accordance with the foregoing object wherein the electrode carried by the injection plunger is positioned at a first location whereby the high frequency heating effect on the plastic material is carried out uniformly throughout the mass of plastic material in the injection cylinder and the electrode carried by the plunger can then be positioned at a second location so that there will be an intensified field of high frequency current set up through which the plastic material must pass before entering the injection nozzle of the machine so as to increase the plasticity of the material just prior to the entry of the same into the nozzle.

It is another object of the invention to provide a system of control for the injection machine for automatically carrying out the operations heretofore set forth in the foregoing objects wherein the injection plunger and the electrode carried thereby are separated independently from one another.

Further objects and advantages will become apparent from the drawings and the following description.

In the drawings:

Figure 1 is a cross sectional schematic view of a machine incorporating features of this invention.

Figure 2 is a schematic view of a machine involving features of this invention, as shown in Figure 1, and the hydraulic circuit for operating the same.

Figure 3 is an electrical diagram of the controls for operating the machine disclosed in Figure 1.

Figures 4, 5, 6 and 7 are diagrammatic views representing the position of the injection plunger and the central electrode therein during various periods of the cycle of operation of the machine.

Figure 8 is a schematic cross sectional view of a slightly modified arrangement of the machine of this invention.

Figure 9 is a schematic wiring circuit for automatically controlling the machine disclosed in Figure 8.

Figures 10, 11 and 12 are diagrammatic views showing the elements of the machine in various positions during the cycle of operation.

Figure 13 is a cross sectional view, somewhat schematic, showing high frequency heating applied to an injection machine.

Figure 14 is a cross sectional view of an extrusion machine, somewhat schematic, showing high frequency heating applied thereto.

In this invention the injection machine consists of an injection cylinder 10 having an injection chamber 11. An injection nozzle 12 is secured to the front end of the injection cylinder 10 by means of the screw thread portion 13. The injection chamber 11 is provided with a uniform diameter throughout the length thereof, the front wall 14 thereof being tapered to form a cone-shaped section. This cone-shaped section can either be provided in the front wall of the chamber 11 or, as illustrated, can be placed in the nozzle 12. The nozzle 12 has an orifice 15 that tapers outwardly from the injection chamber 11 so that the sprue can be drawn from the nozzle orifice 15 when the molded piece is removed from the mold cooperating with the nozzle 12. A cooling chamber 16 may be provided in the injection cylinder 10 for encircling the portion of the cylinder in which the plastic material is to be heated, the purpose of this cooling chamber 16 being hereinafter explained. Suitable fluid conducting conduits 17 and 18 are provided for circulating cooling fluid through the chamber 16, a valve 19 being provided to control the flow of fluid through the conduits 17 and 18.

The injection cylinder 10 has a feed hopper 20 associated therewith into which the granular or powdered plastic material is placed for feeding to the injection cylinder 11. The hopper 20 is provided with an angularly disposed feed chute 21 in which there is placed a feed screw 22 that is driven by an electric motor 23. The feed chute 21 communicates with a feed opening 24 provided in the injection cylinder 10 that conveys granular or powdered plastic material into the injection chamber 11. The hopper 20 and the associated feeding mechanism is suitably supported upon or above the injection cylinder 10 in any conventional manner.

A movable die 25 is positioned adjacent the injection nozzle 12 and is adapted to engage the same in a manner to be hereinafter described. A second movable die 26 co-operates therewith for forming a suitable mold cavity. The movable mold 26 is actuated by means of a hydraulic motor 27 for opening and closing the molds. The motor 27 is of the double acting type whereby the mold 26 will be moved under power in either direction, the motor having fluid conducting conduits 28 and 29 for conveying fluid to and from the motor 27. The dies 25 and 26 are provided with suitable cored passages through which fluid can be circulated for heating or cooling purposes. A fluid inlet connection 30 conducts fluid to the mold or die 26 as controlled by the valve 31 and a conduit 32 conducts fluid from the mold 25, the conduit 33 interconnecting the molds 25 and 26 whereby the heating or cooling fluid can circulate through these molds.

When the machine of this invention is used for injection molding of thermoplastic resins the molds 25 and 26 may be maintained sufficiently cool merely by the normal circulation of room air around the molds or a cooling fluid can be circulated through the same for setting the thermoplastic material. However, when the machine is to be used for injection molding of thermosetting resins then a heating fluid is circulated through the molds 25 and 26 to elevate the temperature of the thermosetting material above the critical temperature for setting the same.

An injection plunger generally designated by the numeral 35 is adapted to be reciprocated within the injection chamber 11 by means of a hydraulic motor 36 that is of the double acting type for moving the injection plunger 35 under power in either direction of movement. Fluid conducting conduits 37 and 38 are provided for conveying fluid to and from the hydraulic motor 36 on opposite sides of the piston 39.

The injection plunger 35 consists of a metal sleeve member 40 that slides within the injection chamber 11 and is finished to close tolerances with the injection chamber 11 to provide a seal against passage of plastic material between the plunger 35 and the injection cylinder 10. The sleeve 40 carries an electrical insulating sleeve 41 that is constructed of a hard fibrous material that electrically insulates a central electrode 42 from the sleeve 40. This electrode 42 moves axially within the injection plunger 45 through a metal sleeve 43 that provides the bearing for the same, the sleeve 43 being finished to close tolerances with the electrode 42 to prevent passage of plastic material between the electrode 42 and the sleeve 43.

The front wall 46 of the injection plunger 35 is provided with the same configuration as the end wall 14 of the injection chamber 11 so that the end wall 46 of the injection plunger 35 can abut the wall 14 of the injection chamber 11 with no clearance provided therebetween. The front wall 47 of the electrode 42 is also provided with a configuration that conforms with the configuration of the wall 14 of the injection chamber 11, so that when the electrode 42 is moved forward within the injection chamber 11 that the wall 47 of the electrode will be spaced equidistant from the wall 14 by the same amount that the periphery of the electrode 42 is spaced radially from the inner periphery of the injection chamber 11 for reasons which will be hereinafter disclosed.

As previously referred to, the electrode 42 is movable axially within the injection plunger 35. To accomplish this operation the rear end of the electrode 42 is provided with an electrical insulated bushing 48 that can be constructed of the same material as the sleeve 41 of the injection plunger 35. The electrode 42 is suitably secured to the bushing 48 such as by means of the nut 49 and is engaged by an electric cable 50 that conducts electric current to the electrode 42.

The bushing 48 is secured to a yoke 51 that extends through a slot 52 provided in the injection plunger 35. Opposite ends of the yoke 51 are connected to the plungers 53 and 54 extending from the hydraulic motors 55 and 56, respectively, the plunger 53 and 54 extending from the pistons 57 and 58 of the motors 55 and 56, respectively. The hydraulic motors 55 and 56 provide means for reciprocating the electrode 42 within the injection plunger 35 independently of the reciprocation of the injection plunger 35 by means of the hydraulic motor 36 in a manner that will be hereinafter described. Fluid conducting means 59 and 60 are provided on opposite ends of the hydraulic motor 55 for supplying fluid to and from the motor 55 on opposite sides of the piston 57. Similar fluid conducting means 62 and 63 are provided for the hydraulic motor 56 for conveying fluid to and from the motor on opposite sides of the piston 58.

The electric cable 50 that is secured to the electrode 42 is connected to one terminal 64 of a source of high frequency electric current 65. The second terminal 66 of the high frequency source 65 is connected to the frame of the injection machine, and as illustrated in Figure 1 is connected to the injection cylinder 10, this cylinder representing a part of the frame of the injection machine. Preferably, this connection represents the ground connection of the electric circuit so that the injection machine will be grounded.

Source of heat

The plastic material in the injection cylinder 10 is heated by the use of high frequency electrostatic heating. The principle of operation of high frequency electrostatic heating should not be confused with high frequency induction heating. In high frequency induction heating, the high frequency magnetic field creates eddy currents in the metal that is being heated. The eddy currents are dissipated and converted into heat at or near the surface of the metal. High frequency electrostatic heating is the result of internal heating of a material rather than a heating of the surface of the material for conduction through the mass. One explanation of the effect of the high frequency electrostatic heating is that the molecules of the material through which the high frequency is carried are repeatedly changed in shape on applying the electric field to the molecules. The frequency of the current that is applied to the mass determines the number of times the molecule is deformed per second and in the case of high frequency electrostatic heating this frequency may be from 1,500,000 to 10,000,000 cycles.

Figure 5 shows the electrode 42 and the injection plunger 35 in their respective positions during the heating cycle for heating the plastic material within the injection chamber 11. As previously described the source of high frequency 65 has the terminals 64 and 66 thereof connected to the electrode 42 and the injection cylinder 10, respectively. When current is applied to the terminals 64 and 66 of the source of high frequency 65, there is a high frequency field set up between the electrode 42 and the injection cylinder 10 whereby the plastic material between the electrode and the injection cylinder is heated due to the molecular friction heretofore referred to. This electrostatic heating of the plastic material within the injection chamber 11 has the advantage of heating the entire mass uniformly throughout its entire cross section so that there will be no localized heating effect upon the plastic material as normally occurs when heating plastic material by surface engagement only. Such high frequency electrostatic heating is particularly advantageous for heating materials that have low heat conducting factors because the high frequency current works uniformly throughout the entire mass of the material. Such high frequency currents as desired to be used in this process can readily be obtained by a conversion of direct current into radio frequency current of the desired frequency by means of mercury vapor amplifier tubes in any conventional manner. Therefore, when the use of high frequency current is referred to in this specification it is to be considered in terms of high frequency electrostatic heating as distinguished from high frequency induction heating.

One of the principal factors in controlling the heating effect upon materials that are heated by high frequency electrostatic heating is to maintain the electrodes equidistantly spaced from one another so that the area between the electrodes is substantially constant whereby uniform heating of the mass between the electrodes is obtained. As the electrodes are brought closer together in certain portions, or sections thereof, the heating effect upon the material between the electrodes is intensified because the electrostatic field is intensified between the electrodes. This characteristic of intensification of heating effect, when the electrodes are close together in certain areas, is used to advantage in the present invention to intensify the heating effect upon the plastic material before it is ejected through the injection nozzle of the injection machine in a manner that will be hereinafter described.

Hydraulic controls

The hydraulic system of controls for the machine consists of a pump 70 that is adapted to produce a relatively constant pressure and may be of the variable delivery type having suitable controls associated with the pump for shifting the same to neutral upon attainment of a predetermined pressure, or could be a constant delivery pump having relief valve means associated therewith for bypassing excess fluid delivered from the pump when the pressure on the delivery side reaches a predetermined maximum. As shown in Figure 2 a control 71 is connected by means of a conduit 72 with a discharge conduit 73 from the pump 70 to regulate the pressure in the conduit 73. The pump 70 receives fluid from the reservoir 74 through a conduit 75.

The fluid conducting means 37 and 38 of hydraulic motor 36 for operating the injection plunger 35 are connected to a self-centering closed center four-way valve 76. This valve 76 is connected to the pump 70 by means of a conduit 77 and with the supply reservoir through a conduit 78. Solenoids 79 and 80 engage the valve member 81 positioned within the valve casing 82 of the valve 76 to shift the member to left or right according to energization of either of the solenoids. When the valve member 81 of the valve 76 is in the center position there will be no flow of fluid to either end of the hydraulic motor 36 thus to prevent movement in either direction. When either solenoid 79 or 80 is energized fluid will flow through one of the fluid conducting means 37 or 38 for actuating the hydraulic motor 36. The spring members 83 and 84 center the valve member 81 in the valve 76 when the solenoids are both de-energized.

A similar self-centering closed center 4-way valve 85, having actuating solenoids 89 and 90, is connected to the fluid conducting means 59 and 60 of the hydraulic motor 55 and the fluid conducting means 62 and 63 of the hydraulic motor 66 are connected in parallel with the fluid conducting means 59 and 60 so that the one valve 85 will operate both fluid motors 55 and 56.

The hydraulic motor 27 for the movable mold 26 has the fluid conducting means 28 and 29 thereof connected to a self-centering closed center 4-way valve 86 of the type heretofore described having the actuating solenoids 87 and 88.

The movable die 25 has single acting hydraulic motors 91 and 92 connected thereto that continuously tend to urge the die 25 away from the nozzle 12, these motors receiving fluid under pressure through the conduit 93 from the pump 70. When the movable die 26 is moved out of engagement with the movable die 25 the hydraulic motors 91 and 92 will cause the die 25 to move away from the nozzle 12 of the injection cylinder 10. This movement breaks the thermal connection between the die 25 and the nozzle 12 so that when thermosetting material is being injection molded in the machine and heat is being applied to the dies 25 and 26 there will be no transfer of heat into the plastic material in the injection cylinder 11 through the nozzle 12. Also, this movement of the die 25 relative to the nozzle 12 causes the sprue in the nozzle 12 to be drawn therefrom, the tapered cross section of the nozzle orifice 15 permitting this withdrawal of the sprue from the nozzle.

Operation

Assuming that the injection plunger 35 and the electrode 42 have just been retracted to their rearmost position, an electric control will de-energize the valves 76 and 85 whereby they will return to closed center position so that no fluid will flow to the hydraulic motors 55, 56 and 36, thereby stopping the injection plunger and the electrode 42 in their rearmost position. Simultaneously, the electric motor 23 will rotate the feed screw 22 for moving a granular plastic material into the injection chamber 11 of the injection cylinder 10. The position of the elements of the apparatus at this time is shown in Figure 1.

As soon as a suitable timing control has timed the feeding of plastic material into the injection chamber 11 to feed a predetermined quantity therein, an electric control will be actuated to energize the valves 76 and 85 whereby fluid will be supplied to the left-hand side of the pistons in the hydraulic motors 55, 56 and 36, thereby causing the injection plunger 35 and the electrode 42 to move forward into the injection chamber 11. The areas of the pistons in the hydraulic motors 55 and 56 are proportioned to the area of the end surface 47 of the electrode 42 relative to the area of the piston in the hydraulic motor 36 to the area of the end 46 of the plunger 35 so that the same fluid pressure applied to the motors 55 and 56 will cause the electrode 42 to move forward into the injection chamber 11 at a greater rate than the movement of the injection plunger 35.

The injection plunger 35 and the electrode 42 will thus move forward through the injection chamber 11 simultaneously so that the injection plunger 35 will carry the granular plastic material forward into the forward end of the injection chamber 11 and the electrode 42 will extend from the forward end thereof outwardly from the injection plunger 35. This action will continue until the electrode 42 actuates an electrical control that de-energizes the valve 85 to permit the same to center itself and thus stop the movement of the electrode 42. This position of the electrode is illustrated in Figure 4 wherein the front wall 47 of the electrode 42 is spaced from the front wall 14 of the injection chamber 11 a distance that is equal to the radial distance between the outer periphery of the electrode 42 and the inner periphery of the injection chamber 11.

The injection plunger 35 has not stopped its forward movement during this time but continues its forward movement to compact the granular plastic material within the forward end of the injection chamber 11. When the granular plastic material has been compressed to a predetermined degree the pressure required to move the piston 39 of the hydraulic motor 36 increases so that this pressure will reflect a predetermined compactness of the granular material. This pressure rise in the hydraulic motor 36 will actuate a pressure control for de-energizing the valve 76 to permit the same to center itself and thus stop further forward movement of the injection plunger 35.

The position of the electrode 42 and the injection plunger 35 with the plastic material precompressed in the forward end of the injection chamber is shown in Figure 5. As soon as the injection plunger 35 has reached the position, as shown in Figure 5, an electric control will be operated to cut on the current to the electrode 42 and the injection cylinder 10 thereby setting up a high frequency field between these two members. As shown in Figure 5, and as previously stated, the surface of the electrode 42 is spaced equidistantly from the surface of the injection chamber 11 so that the electrostatic field set up between the electrode 42 and the injection cylinder 10 will be substantially uniform throughout the entire mass of plastic material within the injection cylinder 11 to uniformly heat this mass. While the heating step has just been referred to as being initiated when the injection plunger 35 arrives at the position shown in Figure 5, it is entirely within the purview of this invention that the heating cycle can start as soon as the electrode 42 has been positioned as shown in Figure 4, that is at the time it is spaced from the front wall of the injection chamber 11, regardless of the position of the injection plunger 35. These two operations can therefore overlap to a certain extent.

Considering the heating of the plastic in the injection chamber 11 is started when the injection plunger 35 stops in the position shown in Figure 5, a timing control is actuated at the time the injection plunger 35 stops to time the heating cycle, in order to bring the temperature of the granular plastic material in the injection chamber 11 up to plasticity.

After a predetermined time period has elapsed, as controlled by the timing control, the valve 85 will be energized to again permit fluid to enter through the conduits 59 and 62 of the hydraulic motors 55 and 56 to again move the electrode 42 to a position that is closely adjacent the front wall 14 of the injection chamber 11, as shown in Figure 6. It will be apparent from the position of the electrode that the electrostatic field between the end wall 47 of the electrode 42 and the wall 14 of the injection chamber 11 will be greatly intensified so that plastic material when passing through the small space provided between the end of the electrode 42 and the wall 14 of the injection chamber 11 will be elevated in temperature considerably above the temperature of the general body of plastic material within the forward end of the injection chamber 11. This intensification of heat at this time permits the plastic material to be raised to a sufficient high temperature that it can be readily injected into the mold. It is to be assumed, of course, that prior to this time that the molds 25 and 26 have been closed by the hydraulic motor 27 by previous actuation of the valve 86 by suitable controls that were actuated by either the injection plunger 35 or the electrode 42 during a previous stroke of movement.

As soon as the electrode 42 arrives at its forward position as shown in Figure 6, an electric control will be actuated to again energize the valve 76 to permit fluid to flow through the conduit 37 into the hydraulic motor 36 and thus advance the injection plunger 35 to produce an injection operation. The plastic material that is held at a temperature of plasticity in the injection chamber 11 has a substantial elevation of temperature imparted thereto when passing between the end of the electrode 42 and the wall 14 as heretofore described.

The injection plunger 35 continues its forward movement until substantially all of the material is discharged from the injection chamber 11 as shown in Figure 7. When the cavity in the dies 25 and 26 is filled with plastic material the injection plunger 35 can no longer move in a forward direction so that the pressure in the hydraulic motor 36 will increase rapidly at this time. This increase of pressure in the hydraulic motor 36 causes actuation of a control member that cuts off the electric energy from the electrode 42 and the injection cylinder 10 so that the plastic material will not be overheated or burned at the sprue opening. This control for cutting off the heat is responsive to the first increase in pressure developed in the fluid motor 36 indicating that the mold has been filled. There is usually a slight movement of the injection plunger after this time until a maximum pressure is reached as controlled by the maximum pressure setting of the pump 70 so as to insure complete filling of the mold and forcing the plastic material into the remote corners of the die cavity. Therefore, this final movement of material through the sprue opening will be at a time when the heat has been removed and the last material entering the sprue opening will be at a somewhat lower temperature than the material that has heat imparted thereto during the intensification period.

After a predetermined dwell period as determined by the timing control the valves 76 and 85 will be operated to cause fluid to be conducted to the right-hand end of the hydraulic motors 55, 56 and 36 to thereby produce retraction of the injection plunger 35 and the electrode 42. Simultaneously, the valve 86 is actuated to cause the motor 27 to open the molds 25 and 26. The machine is then ready for a new cycle of operation.

When using thermoplastic resins in the machine heretofore described and operating the same on the cycle of operation as set forth herein, the plastic will first be heated to a temperature somewhat below the temperature at which it is to be injected into the mold and while it is being injected will have the temperature thereof raised substantially above the previous level. In the case of thermosetting resins, when being injection molded in the machine, this intensification of heating of the plastic material just prior to its ejection from the injection chamber serves the purpose of raising the temperature of the material above the critical point so that it will immediately begin polymerization upon entering the mold. The first heating of the material is such that the temperature thereof is not raised to the critical point. Also, since the plastic material itself is the only substance being heated there will be no temperature lag in the elements of the machine causing the temperature of the plastic material in the injection chamber to raise to polymerization temperature. In fact, since the electric current is turned off to stop the heating effect before the injection plunger has actually stopped movement, the small amount of plastic material between the end of the electrode 42 and the wall 14 of the injection chamber 11 will be forced into the sprue passage 15 of the nozzle 12 so that there will be no high temperature material remaining in the injection chamber 11 around the nozzle orifice 15 when the injection plunger 35 has completed the injection stroke. Therefore, any material that polymerizes will be that in the mold and in the sprue so that when the mold 25 is moved relatively to the nozzle 12 that the sprue will be pulled from the nozzle to clear the same of all polymerized plastic material.

The cooling chamber 16 previously referred to is provided to prevent the temperature of the injection cylinder 10 from elevating and thus producing a heat lag in the plastic material within the injection chamber 11. This cooling of the injection cylinder 10 will have special advantage with connection to the thermosetting resins and a more accurate control of the heating of the material can be obtained because there will be no external heat influence upon the plastic material such as would occur by the surface heating of the material if the injection cylinder 10 was permitted to raise in temperature due to the absorption of heat from the plastic material in the injection chamber 11.

*Electric circuit*

An electric circuit showing one manner in which the machine heretofore disclosed can be operated automatically is disclosed in Figure 3. When the injection plunger 35 reaches its rearmost position it strikes limit switch LS to energize contactor A whereby contacts $A^1$ and $A^2$ are closed to energize a timer TA for controlling the feed cycle and the feed motor 23. When the timer TA has run its period of time the contacts $TA^1$ will be closed to energize the contactor F which opens the normally closed contacts $F^2$ and thereby deenergize contactor A to open contacts $A^1$ and $A^2$ and permit contacts $A^3$ and $A^4$ to close. Opening of contacts $A^1$ and $A^2$ permits the timer TA to reset and stops the feed motor 23.

Closing of the contacts $A^3$ and $A^4$ energizes solenoid 80 of the valve 76 and the solenoid 90 of the valve 85 to cause the injection plunger 35 and the electrode 42 to move forward in a manner heretofore described at the different rates of speed. When the electrode 42 reaches the position shown in Figure 4, a limit switch LS¹ is opened thereby de-energizing the solenoid 90 to stop forward movement of the electrode 42, the injection plunger continuing its forward movement until the pressure operated control T¹ is operated due to the increasing pressure produced in the motor 36 upon compression of the plastic material in the injection cylinder. Closing of the pressure control T¹ energizes the contactor B closing the contacts B² and B³ whereby electric current is supplied to the electrode 42 and the injection cylinder 10 to heat the plastic material and at the same time a second timer TB is started in operation. When the timer TB has run its cycle the contacts TB¹ are closed to again energize the solenoid 90 of the valve 85 to advance the electrode 42 to the position shown in Figure 6 at which time a limit switch LS² is actuated energizing the contactor C² that closes contact C¹ to hold the contactor in and opens contact C² to de-energize the solenoid 90 and thus stop forward movement of the electrode 42. Simultaneously, contacts C³ are closed to energize the solenoid 80 of the valve 76 and again move the injection plunger 35 in a forward motion to eject plastic material from the injection chamber 11.

The injection plunger 35 continues its forward motion until the molds are filled and the pressure begins to rise in the hydraulic motor 36 whereby the pressure operated control T² is closed to energize the contactor D which closes the contacts D¹ and D² for holding the contactor in and for energizing a timing control TC that regulates the dwell period while the plastic material is setting. At this time contacts D³ are opened thereby de-energizing contactor B and opening contacts B³ to cut off the electric current from the source of high frequency and also de-energize the heating timer control TB so that it can reset.

When the timing control TC runs its period it will close contacts TC¹ thereby energizing a contactor E to close contacts E¹ and E² and thereby energize the solenoid 79 of the valve 76, the solenoid 89 of the valve 85 and the solenoid 88 of the valve 86 to reverse the injection plunger 35, the electrode 42 and retract the mold member 26 whereby the machine is in condition for another cycle of operation.

The mold member 26 can be closed upon the mold member 25 at any convenient time in the previous cycle of operation before the injection plunger moves on the injection stroke. Therefore, in the electric circuit shown herein, the mold member 26 is closed upon the mold member 25 when the contactor B is energized closing the contacts B⁴ to energize the contactor G which in turn closes the contacts G¹ and G² and thereby energize the solenoid 87 of the valve 86 to advance the mold 26.

*Modification, machine*

In Figure 8 there is shown a slightly modified arrangement of the machine of this invention having an injection cylinder 100 provided with an injection chamber 101 that has an injection nozzle 102 provided with the tapered nozzle orifice 103. The injection cylinder 100 is provided with a cooling chamber 104 in the same manner as previously referred to in the apparatus disclosed in Figure 1.

An injection plunger 105 constructed and arranged in a manner heretofore described with regard to the plunger 35, shown in Figure 1, is slidably mounted in the injection chamber 101.

The injection plunger 105 is connected to a yoke 106 that is operated by means of a hydraulic motor 107, a motor being positioned on each side of the yoke 106 to actuate the same.

An electrode 108 is slidably mounted axially within the injection plunger 105 and extends from the rear end thereof into engagement with a piston 109 provided within a cylinder 110 that forms a hydraulic motor 111 for reciprocating the electrode 108 within the injection plunger 105. Thus far it will be apparent that the arrangement of the machine is substantially the same as that heretofore described in Figure 1 except that the parts have been slightly rearranged.

The electrode 108 has a cable 112 connected thereto that terminates on one of the terminals of a source of high frequency, a second cable 113 being connected to the injection cylinder 100 in the same manner as heretofore described so that a high frequency field will be established between the electrode 108 and the injection cylinder 100 for heating the plastic material within the injection cylinder 100 as fed therethrough by the injection plunger 105. An insulating member 114 is positioned in the electrode 108 to electrically insulate the same from the machine frame.

The fluid motor 111 for the electrode 108 has fluid conducting conduits 115 and 116 that are connected to a solenoid actuated 4-way valve 117 that is normally retained in one position for delivery of fluid through the line 116 by means of a spring 118 and when energized by a solenoid 119 will direct fluid through the conduit 115, thereby reciprocating the electrode 108 within the injection chamber 101. The hydraulic motor 107 is provided with fluid conducting conduits 120 and 121 that are connected to a solenoid actuated 4-way valve 122 that is arranged to normally supply fluid through the conduit 120, the valve being urged in one direction by means of the spring 123 and when urged in the opposite direction by means of the solenoid 124 will supply fluid through the conduit 121, whereby the injection plunger 105 will be reciprocated in the injection chamber 101.

A source of pressure fluid is provided by means of the pump 125 that may be of either of the types heretofore referred to for maintaining pressure in the supply line 126 by means of the control element 127. The pump receives its fluid supply from a reservoir 128 through a conduit 129. The delivery from the pump 125 is conducted to the valve 117 by a conduit 130 and to the valve 122 by means of a conduit 131, the valves 117 and 122 having return conduits 132 and 133, respectively, for returning fluid to the reservoir 128. It is to be understood, of course, that the injection cylinder 100 co-operates with suitable molds 134 and 135 that can be heated, cooled and operated in the same manner as heretofore described in regard to the molds 25 and 26 in Figure 1.

*Cycle of operation*

Assuming the plunger 105 to be in its retracted position and the electrode 108 to be in position as shown in Figure 8, the plastic material will be fed through the feed opening 136 by a feeding mechanism similarly to that previously described in regard to Figure 1. When the plunger 105 was retracted an electric control energized a timing control for the feeding mechanism as well as the electric motor for the same. When the timing control has cycled for feeding a predetermined quantity of material into the injection chamber 101, the valve 122 will be actuated to operate the hydraulic motor 107 for advancing the plunger 105 through the injection chamber 101. When the injection plunger passes over the feed opening 136 an electric switch is closed whereby high frequency current is supplied to the electrode 108 and the injection cylinder 100 for establishing a high frequency field therebetween for heating the plastic material. During this heating period the source of high frequency current is controlled by a temperature responsive device 137 such as a thermo-couple control to regulate the temperature of the plastic material within the injection chamber 101 to prevent the temperature thereof from elevating above a predetermined temperature.

As will be noted in Figure 8, the electrode 108 is positioned within the injection chamber 101 so that the end wall 138 thereof is spaced from the end wall 139 of the injection chamber 101 a distance that is equal to the radial distance between the periphery of the electrode 108 and the injection chamber 101 whereby the effect of the electrostatic heating within the plastic material will be uniform throughout the entire mass.

The injection plunger 105 continues its forward stroke until the plastic material within the injection chamber 101 has been precompressed to a degree that the pressure required to move the injection plunger forward increases in the hydraulic motor 107. At this time a pressure operated control is actuated to operate the valve 117 whereby the hydraulic motor 111 is allowed to move the electrode 108 forward within the injection chamber 101 to a position such as that shown in Figure 10, the injection plunger 105 being approximately in the position shown in Figure 10 with the plastic material in front of the same being held under precompression, it being understood that the injection plunger 105 has not stopped but this is one position of the injection plunger during one period of the injection cycle. While it is preferable to control the movement of the electrode 108 in its forward movement by the degree of precompression of the plastic material in the injection chamber 101, yet this control could be by means of a limit switch that is actuated when the plunger 105 reaches a predetermined position in its forward stroke.

The position of the electrode 108, as shown in Figure 10, is for the purpose of intensifying the heating effect upon the plastic material as it passes between the end of the electrode 108 and the end wall 139 of the injection chamber 101 in the manner as heretofore described.

With the injection plunger 105 still moving in a forward direction, plasticized material will now be ejected from the injection chamber 101 into the dies 134 and 135, the plastic material being raised in temperature above the plasticizing point as held in the injection chamber 101 when passing between the end of the electrode 108 and the end wall 139 of the injection chamber. The injection plunger 105 continues its forward movement until the cavities in the molds 134 and 135 are filled.

At the time the injection plunger begins the injection of plastic material, which is at the time the electrode 108 has moved forward into the position shown in Figure 11, an electric control is actuated for by-passing the temperature control of the high frequency source of current so that the temperature control will not cut off the current from the electrode 108 during the time it is in the position shown in Figure 11 so that there will be a continuous intensification of the heating effect upon the plastic material during the injection period.

When the cavities in the molds or dies 134 and 135 are filled, the injection plunger 105 is stopped from further forward movement due to the fact that the plastic material can no longer be ejected from the injection chamber 101 so that the pressure in the hydraulic motor operating the injection plunger 105 will rise. This rise in pressure will operate a pressure responsive control for actuating a timing control that regulates the dwell period of the plunger in its forward position to hold pressure on the plastic material in the molds during the time that the material is setting. This same pressure responsive control will also cause operation of the valve 117 to actuate the hydraulic motor 111 and cause the electrode 108 to be withdrawn to the position shown in Figure 12, which immediately stops the intensification of the heating effect upon the plastic material in the forward end of the injection chamber 101. Also, the source of high frequency current is again placed under control of the temperature responsive control.

Since the pressure responsive control can be set to operate upon the first indication of a rise in pressure, which indicates that the mold is almost full, the electrode 108 can be withdrawn from the position shown in Figure 11 to the position shown in Figure 12 before the plunger 105 has actually stopped its forward movement. The final forward movement of the plunger to completely fill the mold, and to fill the void that is created by the withdrawal of the electrode 108 will move plastic material from the general mass of material in the forward end of the injection chamber 101 into the injection nozzle orifice 103 so that the material in the front end of the nozzle orifice will be material which is at a temperature below the temperature of the plastic material that has had the heat intensified therein before its passage into the nozzle. Therefore, plastic material at plasticizing temperature only will be in the forward end of the nozzle orifice 103 so that when the molds 134 and 135 are moved away from the nozzle 102 in a manner heretofore described with regard to the operation disclosed in Figure 1, the sprue in the nozzle orifice will be withdrawn therefrom. As previously disclosed this operation of the electrode is particularly advantageous when using thermosetting resins in the injection machine because the final material that is forced into the nozzle orifice 103 will be at a temperature below the critical temperature of the material so that it will not polymerize in the nozzle orifice, or at least there will be a portion of the nozzle orifice that will contain material below polymerization temperature so that the material which is polymerized in the nozzle orifice can be withdrawn therefrom when the dies 134 and 135 are withdrawn from the nozzle 102.

When the timing control that regulates the dwell period has finished the time cycle thereof, the valve 122 will be permitted to operate to again actuate the hydraulic motor 107 to withdraw the injection plunger 105 into the position shown in Figure 8, and the high frequency current will be cut off to stop the heating effect thereof during the actual feeding cycle of fresh plastic material, at which time an electric control will be actuated to again start an automatic cycle of operation.

Electric circuit

A schematic electric circuit showing one manner in which the machine disclosed in Figure 8 can be operated consists of a limit switch $LS^1$ that is engaged by the plunger 105 when in the completely retracted position as shown in Figure 8, thereby energizing the contactor A, the contacts $B^2$ in this circuit being closed at this time as a result of a previous operation. The contactor A closes the contacts $A^1$ and $A^2$ thereby energizing the feed motor for the feeding apparatus and a timing control TA.

When the injection plunger is in its retracted position, limit switch $LS^2$ has also been opened during the retraction movement of the plunger so that the high frequency current to the electrode 108 and the injection cylinder 100 is cut off to stop the heating of the plastic material when granular material is entering the injection chamber through the feed opening 136.

When the timing control TA has completed its cycle the contacts $TA^1$ will be opened thereby de-energizing the contactor B, the contacts $TB^1$ in this circuit having been closed by a previous operation in the cycle of operation. When the contactor B is de-energized, contacts $B^1$ and $B^2$ will be opened and contacts $B^3$ will be closed to energize the solenoid 124 of the valve 122 to thereby supply fluid through the conduit 120 of the hydraulic motor 107 to move the injection plunger in a forward stroke.

When the injection plunger 105 passes over the feed opening 136 the limit switch $LS^2$ will be permitted to close thereby cutting on the high frequency current to the electrode 108 to again start the heating of plastic material in the injection cylinder 101.

The injection plunger 105 continues its forward motion to precompress the plastic material in the injection chamber 101 until the pressure in the motor 107 increases to operate a pressure actuated control $T^1$ which thereby energizes the contactor C for closing the contacts $C^1$, $C^2$ and $C^3$. Contacts $C^2$ energizes the solenoid 119 to shift the valve 117 to supply fluid through the conduit 115 to the fluid motor 111 and thus advance the electrode 138 to the position shown in Figure 10. Closing of contacts $C^3$ by-passes the thermocouple control of the high frequency current and the limit switch $LS^2$ so that high frequency current will be continuously supplied to the electrode 108 as long as it is in the position as shown in Figure 10. As previously referred to, this operation can be controlled by the position of the injection plunger 105 rather than by the pressure operated control if desired.

The injection plunger 105 continues its forward movement ejecting plastic material from the injection cylinder 100 until the cavities in the molds 134 and 135 are full. At this time the pressure for operating the hydraulic motor 107 increases due to the increased resistance met by the plunger 105 whereby a pressure operated control $T^2$ is actuated to energize a contactor D for closing contacts $D^1$ and $D^2$ for opening contacts $D^3$. Closing of contacts $D^2$ energizes a timing control TB that regulates the dwell period of the injection plunger. Opening of contacts $D^3$ de-energizes contactors C thereby opening contacts $C^2$ and $C^3$ to de-energize solenoids 119 to permit the hydraulic motor to reverse the position of the electrode 108 to the position shown in Figure 12 and simultaneously return the source of high frequency current under control of the thermocouple control TH to prevent overheating of the plastic mass in the injection cylinder and simultaneously stop the intensification of the heating effect in the end of the injection chamber 101.

When the timing control TB has run its timed cycle, contacts $TB^1$ are closed to energize contactor B and thereby close contacts $B^2$ to condition the circuit of limit switch $LS^1$ for operation and open contacts $B^3$ to de-energize the solenoid 124 to shift the valve 122 and permit fluid to be circulated through the conduit 121 to the motor 107 to return the injection plunger 105 to its retracted position whereupon limit switch $LS^1$ is re-engaged and another cycle of operation can be performed.

In Figure 13 is schematically shown an injection machine of somewhat conventional type wherein the principle of high frequency electrostatic heating is used for heating the plastic material when it is fed through the injection chamber of the machine. The conventional plastic injection machine works on a substantially continuous cycle wherein the injection plunger reciprocates within an injection cylinder for feeding charges of plastic material through the cylinder which are heated in their passage through the injection cylinder by heating means that conveys heat to the plastic material by surface conduction. In the arrangement shown in Figure 13 the injection machine is referred to as a somewhat conventional plastic injection machine because the normal cycle of such machines is not interfered with, but the heating arrangement for the plastic material has been altered to incorporate the use of high frequency electrostatic heating of the plastic material.

In this arrangement the injection machine consists of an injection cylinder 160 having an injection chamber 161 and a nozzle 162. Granular plastic material is fed into the injection chamber 161 by means of the feed screw 163 through a feed opening 164. Dies 165 and 166 are associated with the nozzle 162 to receive plastic material ejected through the nozzle from the injection chamber 161.

An injection plunger 167 reciprocates within the injection chamber 161 and is actuated by means of a hydraulic motor 168 having a piston 169, the cylinder 168 receiving fluid through the fluid conducting conduits 170 and 171.

A central electrode 172 is positioned axially within the injection plunger 167 and is electrically insulated from the same by means of the insulating sleeve 173. The electrode 172 is stationarily mounted upon the frame of the injection machine and as illustrated in the drawings, the electrode 172 is connected with an electrically insulating bushing 174 that is secured to a yoke 175 carried upon the hydraulic motor 168. It will thus be seen that the injection plunger 167 will reciprocate in the injection chamber 161 and upon the electrode 172.

The electrode has the front end 176 thereof spaced from the end wall 177 of the injection chamber 161 a distance equal to the radial distance between the periphery of the electrode 172 and the inner periphery of the injection chamber 161. As previously described, when the electrode 172 is thus positioned within the injection chamber 161 a high frequency electrostatic field is set up between the electrode 172 and the injection cylinder 160 so that the heating effect of the high frequency field upon the plastic material will be uniform throughout the entire mass of the material. It is, of course, understood that the electrode 172 is connected to one side of a source of high frequency current by means of an electric conductor 178 and the injection cylinder 160 is connected to the opposite side of the source of high frequency current by means of the electric conductor 179.

The supply of high frequency current to the electrode 172 and the injection cylinder 160 can be regulated by means of a temperature responsive control 180 that may be a thermo-couple control to prevent overheating of the plastic material within the injection chamber 161. As previously described with regard to the operation of the apparatus disclosed in Figure 8, the thermo-couple control 180 can be short circuited at the time the injection plunger 167 is retracted beyond the feed opening 164 and until it is again advanced beyond the feed opening 164 to prevent heating of the plastic material when it is entering the injection chamber 161 due to operation of the feed screw 163. At all other times, the source of high frequency current can continuously supply current to the electrode 172 and the injection cylinder 160 to maintain a continuous high frequency field therebetween for heating the plastic material as it moves through the injection chamber 161.

Any of the controls heretofore described can be used upon the injection machine, as shown in Figure 13, or normal conventional controls can be used for regulating the operation of the injection machine through what may be termed as a normal injection cycle.

As previously described a cooling chamber 181 can be provided in the injection cylinder 160 to prevent overheating of the plastic material within the injection cylinder, or to prevent residual heat from effecting the temperature regulation of the plastic material passing through the injection cylinder.

In Figure 14 there is shown an extrusion apparatus for extruding plastic material wherein high frequency electrostatic heating is used for heating the plastic material in the extrusion chamber.

In this apparatus the machine consists of an extrusion cylinder 190 having an extrusion chamber 191 provided with a feed opening 192 through which plastic material is fed into the extrusion chamber 191. The forward end 192 of the extrusion chamber 191 is provided with a tapering wall that converges toward an extrusion opening 193 provided in an extrusion die 194.

An extrusion screw 195 is positioned within the extrusion chamber 191 and consists of a metal sleeve 196 upon which the flights 197 of the screw are mounted. An electrically insulating sleeve 198 is positioned within the metal sleeve 196 and receives the shank 199 of an electrode 200 that has a tapered nose portion 201 contoured similar to the contour of the forward end of the extrusion chamber 192 so that the surface area of the nose 201 will be spaced equidistantly from the surface area of the forward end 192 of the extrusion chamber, whereby a high frequency field can be set up between the nose 201 of the extrusion screw and the extrusion cylinder 190 that will be uniformly acting throughout its area to uniformly heat plastic material moving therebetween in a manner as has heretofore been described. It is to be understood, of course, that the electrode 200 is connected to a source of high frequency current by means of the electric conductor 202 and the extrusion cylinder 190 is connected to the opposite terminal of the source of high frequency current by means of the electric conductor 203.

The extrusion screw 195 can be driven by means of an electric motor 204 through a gear reduction mechanism 205 that is geared to the extrusion screw by means of gears 206.

If desired, the temperature of the plastic material within the forward end 192 of the extrusion chamber 191 can be controlled by means of a temperature responsive control member 207 such as a thermo-couple control in a manner heretofore described with regard to the other mechanisms previously referred to in this specification. Also, cooling chambers 208 and 209 can be provided in the extrusion cylinder 208 to more closely regulate the temperature of the plastic material passing through the extrusion chamber and to prevent residual heat from effecting the temperature regulation of the material. If desired, the chamber 209 can receive a heating fluid to preheat the plastic material in this portion of the extrusion machine so as to reduce somewhat the load carried by the high frequency electrostatic heating means. Also, the extrusion die 194 could have electrodes disposed therein to create an electrostatic field within the die for maintaining the desired temperature of the plastic material when passing through the die, this electrostatic field being under independent temperature control if desirable.

While the apparatus disclosed and described herein constitutes a preferred form of the invention, yet it is to be understood that the apparatus is capable of substantial alteration without departing from the spirit of the invention, and that all such modifications as fall within the scope of the appended claims are intended to be included herein.

Having thus fully described my invention, what I claim as new and desire to secure by Letters Patent is:

1. The method of heating a body of plastic material by the use of high frequency current which consists of placing a body of plastic material between electrodes that have the surface areas thereof spaced substantially equidistantly throughout their respective areas, impressing a high frequency electric current upon the electrodes to establish a field of high frequency energy therebetween to uniformly heat the body of plastic material while positioned therebetween, of subsequently moving one of the electrodes relative to the other to position a portion of their surface areas in substantially closer relationship without substantially affecting the equidistantly spaced relationship of other portions of the areas thereof whereby to intensify the heating effect of the high frequency field between the areas of the electrodes that are spaced relatively close together, and moving the heated plastic material between the closely spaced areas of the electrodes to apply the intensified heating effect upon the material passing therebetween.

2. A method of heating plastic material by the use of high frequency current which consists of positioning electrodes with their surface areas spaced equidistantly from one another, of applying a high frequency electric current upon the electrodes to establish a field of high frequency energy therebetween, of placing plastic material between the electrodes while their surfaces are maintained in equidistantly spaced relationship for uniformly heating the plastic material throughout its entire mass by the application of high frequency current to the electrodes, of moving one of the electrodes relative to the other to position at least one portion of their surface areas in closer relationship than other portions thereof whereby the intensity of heating effect of the high frequency field between the portions of the electrodes that are in closer relationship is intensified, and of moving the plastic material that has been uniformly heated throughout its mass through the zone having the intensified heating effect for increasing the temperature of the plastic material as it passes therethrough above the previous temperature level.

3. A method of heating plastic material by the use of high frequency energy which consists of placing plastic material between electrodes arranged to produce a zone having a uniformly acting high frequency field for uniformly heating the mass of plastic material throughout the entire body thereof while it is within said zone, of applying a high frequency electric current upon the electrodes to establish a field of high frequency energy therebetween, and of moving the heated plastic material between electrodes arranged to produce a second zone having a high frequency field of greater intensity than of the first zone to thereby elevate the temperature of the heated plastic material as it passes through the second zone to above the temperature obtained in the first zone.

4. A method of heating plastic material in a plastic injection machine which consists, of creating, by the utilization of a high frequency electrical current, a high frequency field in the injection chamber of an injection machine that is uniformly acting throughout the field, of placing plastic material within the uniformly acting high frequency field in the injection cylinder to uniformly heat the plastic material while within the field, of creating a second high frequency field within the injection cylinder of the machine adjacent to the nozzle thereof having a greater intensity than the first high frequency field, and of moving the plastic material heated in the first high frequency field through the second high frequency field to increase the temperature thereof above the temperature created in the plastic material in the first high frequency field.

5. A method of heating plastic material by the use of high frequency energy which includes, producing, by the utilization of a high frequency electrical current, a zone of high frequency energy that is substantially uniformly acting throughout the zone, placing plastic material within the uniformly acting high frequency zone to raise the temperature thereof substantially uniformly throughout the mass of the plastic material, temporarily increasing the intensity of the high frequency in a portion of said zone above the intensity in the remainder thereof, moving the heated plastic material through the intensified portion of said zone while intensified to increase the temperature of the plastic material above the initial heating temperature while passing through the intensified zone, and subsequently reducing the intensity of the high frequency field in the said portion of said zone after a certain quantity of plastic material has passed therethrough whereby to retain a uniform heating effect upon the plastic material throughout the zone.

6. A method of heating plastic material by the use of high frequency energy which includes, producing, by the utilization of a high frequency electrical current, a zone of high frequency energy that is substantially uniformly acting throughout the zone, placing plastic material within the uniformly acting high frequency zone to raise the temperature thereof substantially uniformly throughout the mass of the plastic material, temporarily increasing the intensity of the high frequency in a portion of said zone above the intensity in the remainder thereof, moving the heated plastic material through the intensified portion of said zone while intensified to increase the temperature of the plastic material above the initial heating temperature while passing through the intensified zone, and subsequently reducing the intensity of the high frequency field in the said portion of said zone substantially to the level of the initial intensity thereof after a certain quantity of plastic material has passed therethrough whereby to retain a uniform heating effect upon the plastic material throughout the zone.

7. A method of heating plastic material that moves through the injection chamber of the plastic injection machine and is ejected through the nozzle thereof which includes, producing, by the utilization of a high frequency electrical current, a zone of high frequency energy within the injection chamber that is substantially uniformly acting throughout the zone, moving plastic material into the uniformly acting zone of high frequency energy to uniformly heat the mass of plastic material while within the uniformly acting zone of high frequency energy, producing a second zone of high frequency energy within the injection chamber and adjacent to the nozzle thereof that has an intensity greater than the intensity of the first zone, and moving plastic material heated in the first zone through the second zone for raising the temperature thereof above the temperature produced in the first zone before entering the nozzle of the injection machine.

8. A method of heating plastic material that moves through the injection chamber of the plastic injection machine and is ejected through the nozzle thereof which includes, producing, by the utilization of a high frequency electrical current, a zone of high frequency energy within the injection chamber that is substantially uniformly acting throughout the zone, moving plastic material into the uniformly acting zone of high frequency energy to uniformly heat the mass of plastic material while within the uniformly acting zone of high frequency energy, producing a second zone of high frequency energy within the injection chamber and adjacent to the nozzle thereof that has an intensity greater than the intensity of the first zone, moving plastic material heated in the first zone through the second zone for raising the temperature thereof above the temperature produced in the first zone before entering the nozzle of the injection machine, and reducing the intensity of the high frequency energy in the second zone to substantially the level of that in the first zone after a measured quantity of plastic material has passed through the second zone whereby to maintain a uniform heating effect upon the plastic material within the injection chamber.

9. A method of heating plastic material that moves through the injection chamber of the plastic injection machine and is ejected through the nozzle thereof which includes, producing, by the utilization of a high frequency electrical current, a zone of high frequency energy within the injection chamber that is substantially uniformly acting throughout the zone, moving plastic material into the uniformly acting zone of high frequency energy to uniformly heat the mass of plastic material while within the uniformly acting zone of high frequency energy, producing a second zone of high frequency energy within the injection chamber and adjacent to the nozzle thereof that has an intensity greater than the intensity of the first zone, moving plastic material heated in the first zone through the second zone for raising the temperature thereof above the temperature produced in the first zone before entering the nozzle of the injection machine, reducing the intensity of the high frequency energy in the second zone to substantially the level of that in the first zone after a measured quantity of plastic material has passed through the second zone whereby to maintain a uniform heating effect upon the plastic material within the injection chamber, and subsequently moving a small quantity of plastic material into the second zone from the first zone after the intensity of the high frequency current has been reduced in the second zone to place plastic material in the second zone that is substantially at the same temperature as the plastic material in the first zone.

10. A method of injection molding plastic materials in an injection machine having an injection cylinder provided with a nozzle that engages a mold and has an opening therein through which plastic material is moved into the mold and a plunger for moving the plastic material through the injection cylinder which includes, feeding plastic material into the injection cylinder of the machine, producing, by the utilization of a high frequency electrical current, a zone of high frequency energy within the injection cylinder that is uniformly acting throughout the zone, moving the plastic material into the uniformly acting zone of high frequency to uniformly heat the plastic material while in the zone, temporarily increasing the intensity of the high frequency energy in a portion of said zone within the injection cylinder above the intensity in the remainder thereof and adjacent to the nozzle of the injection cylinder, moving the heated plastic material through the intensified portion of said zone while intensified to increase the temperature thereof above the temperature produced in the remaining portion of said zone before the material enters the nozzle of the machine, and reducing the intensity of the high frequency current in the intensified portion of said zone when the mold co-operating with the injection cylinder has been filled whereby to maintain a uniform heating effect upon the plastic material throughout the zone.

11. A method of injection molding plastic materials in an injection machine having an injection cylinder provided with a nozzle that engages a mold and has an opening therein through which plastic material is moved into the mold and a plunger for moving the plastic material through the injection cylinder which includes, feeding plastic material into the injection cylinder of the machine, producing, by the utilization of a high frequency electrical current, a zone of high frequency energy within the injection cylinder that is uniformly acting throughout the zone, moving the plastic material into the uniformly acting zone of high frequency to uniformly heat the plastic material while in the zone, temporarily increasing the intensity of the high frequency energy in a portion of said zone within the injection cylinder above the intensity in the remainder thereof and adjacent to the nozzle of the injection cylinder, moving the heated plastic material through the intensified portion of said zone while intensified to increase the temperature thereof above the temperature produced in the remaining portion of said zone before the material enters the nozzle of the machine, and reducing the intensity of the high frequency current in the intensified portion of said zone just prior to complete filling of the mold co-operating with the injection cylinder whereby a small quantity of plastic material passes through the said intensified zone for entry into the nozzle of the machine without having the temperature thereof elevated above the temperature of the plastic material in the unintensified zone.

12. A method of heating plastic material within an injection machine having an injection cylinder and a nozzle therefor through which plastic material is moved by means of an injection plunger which includes, positioning an electrical conducting member within the injection cylinder to conduct a high frequency current into the injection cylinder and establish a field of high frequency energy within the injection cylinder that is uniformly acting throughout the area of the injection cylinder, applying a high frequency electric current on the conducting member and the cylinder to produce a high frequency field therebetween, moving plastic material into the field of high frequency energy to uniformly raise the temperature of the plastic material, moving the electrical conducting member relative to the injection cylinder to bring a portion thereof adjacent the nozzle for the injection cylinder and increase the intensity of the high frequency field adjacent the nozzle of the injection cylinder, and moving the heated plastic material through the intensified high frequency field to further elevate the temperature of the plastic material as it enters the nozzle for the injection cylinder.

13. A method of heating plastic material within an injection machine having an injection cylinder and a nozzle therefor through which plastic material is moved by means of an injection plunger which includes, positioning an electrical conducting member within the injection cylinder to conduct a high frequency current into the injection cylinder and establish a field of high frequency energy within the injection cylinder that is uniformly acting throughout the area of the injection cylinder, applying a high frequency electric current on the conducting member and the cylinder to produce a high frequency field therebetween, moving plastic material into the field of high frequency energy to uniformly raise the temperature of the plastic material, moving the electrical conducting member relative to the injection cylinder to bring a portion thereof adjacent the nozzle for the injection cylinder and increase the intensity of the high frequency field adjacent the nozzle of the injection cylinder, moving the heated plastic material through the intensified high frequency field to further elevate the temperature of the plastic material as it enters the nozzle for the injection cylinder, and subsequently moving the electrical conducting member relative to the injection cylinder to return the same to initial position and thereby remove the intensified field of high frequency energy from adjacent the nozzle.

14. A method of heating plastic material within an injection machine having an injection cylinder and a nozzle therefor through which plastic material is moved by means of an injection plunger which includes, positioning an electrical conducting member within the injection cylinder to conduct a high frequency current into the injection cylinder and establish a field of high frequency energy within the injection cylinder that is uniformly acting throughout the area of the injection cylinder, applying a high frequency electric current on the conducting member and the cylinder to produce a high frequency field therebetween, moving plastic material into the field of high frequency energy to uniformly raise the temperature of the plastic material, moving the electrical conducting member relative to the injection cylinder to bring a portion thereof adjacent the nozzle for the injection cylinder and increase the intensity of the high frequency field adjacent the nozzle of the injection cylinder, moving the heated plastic material through the intensified high frequency field to further elevate the temperature of the plastic material as it enters the nozzle for the injection cylinder, and subsequently moving the electrical conducting member relative to the injection cylinder to return the same to initial position and thereby remove the intensified field of high frequency current from adjacent the nozzle prior to completion of the injection stroke of the machine whereby plastic material as initially heated will be forced into the injection nozzle at completion of the injection stroke of the machine.

15. An injection molding apparatus having means for heating plastic material therein which includes, an injection cylinder, an injection plunger reciprocable in said cylinder, an electrode within said plunger extending from the end thereof to within said cylinder and spaced therefrom and over which said plunger reciprocates, and a source of high frequency current connected to said cylinder and to said electrode for establishing a field of high frequency current therebetween.

16. An injection molding apparatus having means for heating plastic material therein which includes, an injection cylinder, an injection plunger reciprocable in said cylinder, an electrode within said plunger extending from the end thereof to within said injection cylinder in spaced relation thereto and to a position wherein the end of said electrode is spaced from the end of said injection cylinder a distance equal to the radial distance between the periphery of the electrode and the inner periphery of said cylinder, and a source of high frequency current connected to said injection cylinder and said electrode to establish a high frequency field therebetween having uniformly acting characteristics throughout the field.

17. An injection molding apparatus having means for heating plastic material therein which includes, an injection cylinder, an injection plunger reciprocable in said cylinder, an electrode positioned within said cylinder and adapted to extend from said plunger within said injection cylinder to a position wherein the end of said electrode is spaced from the end of said injection cylinder a distance equal to the radial distance between the periphery of the electrode and the inner periphery of said cylinder, a source of high frequency current connected to said injection cylinder and said electrode to establish a high frequency field therebetween having uniformly acting characteristics throughout the field, and means for positioning the end of the electrode closely adjacent the end of the injection cylinder to intensify the high frequency field therebetween.

18. An injection machine for molding of plastic materials which includes, an injection cylinder, an injection plunger reciprocable in said cylinder, an electrode reciprocable within said plunger and adapted to extend from the end thereof into the injection cylinder, and independent means for reciprocating said injection plunger and said electrode relatively to one another.

19. An injection machine for injection molding of plastic material including, an injection cylinder, an injection plunger reciprocable therein, an electrode reciprocable within said plunger and electrically insulated from the same, said cylinder and said electrode being adapted to be connected to a source of high frequency, and means for reciprocating said electrode within said cylinder and within said plunger to extend the same beyond said plunger, whereby a field of high frequency current can be established between said electrode and said cylinder for heating plastic material passing through said cylinder.

20. An injection machine for injection molding of plastic material including, an injection cylinder, an injection plunger reciprocable therein, an electrode reciprocable within said plunger and electrically insulated from the same, said cylinder and said electrode being adapted to be connected to a source of high frequency, electrode actuating means for positioning said electrode within said cylinder to extend the same beyond said plunger with the end of said electrode positioned from the end wall of said cylinder a distance substantially equal to the radial distance between said cylinder and said electrode whereby a field of high frequency energy can be established therebetween having uniformly acting characteristics for uniformly heating plastic material disposed between said electrode and said cylinder, said electrode actuating means also providing means for positioning the end of said electrode within said cylinder closely adjacent the end wall of said cylinder whereby an intensified zone of high frequency energy may be obtained, and means for moving said plunger to move the heated plastic from the injection cylinder through the zone of intensified heating when ejecting the material from the cylinder.

21. An injection machine for injection molding of plastic material including, an injection cylinder, an injection plunger reciprocable therein, an electrode reciprocable within said plunger and electrically insulated from the same, said cylinder and said electrode being adapted to be connected to a source of high frequency, electrode actuating means for positioning said electrode within said cylinder to extend the same beyond said plunger with the end of said electrode positioned from the end wall of said cylinder a distance substantially equal to the radial distance between said cylinder and said electrode whereby a field of high frequency energy can be established therebetween having uniformly acting characteristics for uniformly heating plastic material disposed between said electrode and said cylinder, said electrode actuating means also providing means for positioning the end of said electrode within said cylinder closely adjacent the end wall of said cylinder whereby an intensified zone of high frequency energy may be obtained, means for moving said plunger to move the heated plastic from the injection cylinder through the zone of intensified heating when ejecting the material from the cylinder, and means for withdrawing said end of said electrode from its closely spaced position from the end wall of said cylinder to stop the intensified heating of the plastic material.

22. An injection machine for injection molding of plastic material including, an injection cylinder, an injection plunger reciprocable therein, an electrode reciprocable within said plunger and electrically insulated from the same, said cylinder and said electrode being adapted to be connected to a source of high frequency, electrode actuating means for positioning said electrode within said cylinder to extend the same beyond said plunger with the end of said electrode positioned from the end wall of said cylinder a distance substantially equal to the radial distance between said cylinder and said electrode whereby a field of high frequency energy can be established therebetween having uniformly acting characteristics for uniformly heating plastic material disposed between said electrode and said cylinder, said electrode actuating means also providing means for positioning the end of said electrode within said cylinder closely adjacent the end wall of said cylinder whereby an intensified zone of high frequency energy may be obtained, means for moving said plunger to move the heated plastic from the injection cylinder through the zone of intensified heating when ejecting the material from the cylinder, and means for withdrawing said electrode from its closely spaced position relative to the end wall of said cylinder prior to completion of the injection stroke of said plunger.

HOWARD F. MacMILLIN.